United States Patent [19]
Kim

[11] Patent Number: 5,813,598
[45] Date of Patent: Sep. 29, 1998

[54] THERMOSTAT DEVICE FOR PROTECTING AN ENGINE OF A VEHICLE FROM OVERHEATING

[75] Inventor: Yoon-Taek Kim, Kyungki-Do, Rep. of Korea

[73] Assignee: Hyundai Motor Company, Ltd., Seoul, Rep. of Korea

[21] Appl. No.: 738,288

[22] Filed: Oct. 25, 1996

[51] Int. Cl.[6] ....................................................... F01P 7/16
[52] U.S. Cl. ................................... 236/34.5; 236/DIG. 2
[58] Field of Search ............................... 236/34.5, DIG. 2

[56] References Cited

U.S. PATENT DOCUMENTS

| | | | |
|---|---|---|---|
| 2,690,874 | 10/1954 | Stubblefield | 236/DIG. 2 |
| 4,245,782 | 1/1981 | Brown | 236/DIG. 2 |
| 5,174,496 | 12/1992 | Bourgin | 236/DIG. 2 |
| 5,188,287 | 2/1993 | Chamot | 236/DIG. 2 |
| 5,503,329 | 4/1996 | Saladino | 236/DIG. 2 |

*Primary Examiner*—William E. Tapolcai

[57] ABSTRACT

A thermostat device includes a housing having an inlet port and an outlet port. A valve seat is disposed in the housing and has an aperture therein. A first valve opens and closes the aperture under the control of a temperature sensitive device. The temperature sensitive device senses a temperature of fluid supplied to the inlet port, and controls the operation of the first valve based on the sensed temperature. The thermostat also includes a fail safe structure which allows the fluid supplied to the inlet port to flow through a portion of the aperture when the temperature sensitive device malfunctions.

7 Claims, 2 Drawing Sheets

THERMOSTAT DEVICE FOR PROTECTING AN ENGINE OF A VEHICLE FROM OVERHEATING

BACKGROUND OF THE INVENTION

1. Field of the Invention

The present invention relates to a thermostat device for protecting an engine of a vehicle from overheating and more particularly, an improved thermostat device which operates in a fail safe mode should the thermostat malfunction.

2. Description of Related Art

Various types of thermostats disposed along a cooling water passage between an engine and a radiator of a vehicle are known in the art. Generally, such a thermostat controls the circulation of cooling water based on the temperature thereof.

As shown in FIGS. 1 and 2, a conventional thermostat includes a pallet b containing wax a which expands or contracts depending on changes in heat (i.e., temperature). The conventional thermostat further includes a piston d having a pressing plate g disposed within the pallet b and in contact with the wax a. The other end of the piston d is fixed to an upper frame c. A valve f is resiliently attached to a spring e and fixed to the pallet b. Accordingly when the wax a expands depending on the temperature of the cooling water, the valve f united with the pallet b moves down to open the cooling water passage (see FIG. 2).

Conventional thermostats, however, suffer from a number of problems. For example, if the wax a should leak, the thermostat will not work as intended. Specifically, at first the valve f slightly closes the cooling water passage causing the pressure of the cooling water (FIG. 1) to increase, and preventing the cooling water in the engine of the vehicle from circulating freely. Finally, the valve f closes the cooling water passage completely due to the increasing pressure of the cooling water. Because the malfunctioning thermostat prevents the cooling water from flowing from the engine to the radiator, heat builds up in the cooling water.

Accordingly, overheated cooling water can cause a lot of damage to the engine, and if the driver does not check the cooling water, the vehicle can reach a serious condition.

SUMMARY OF THE INVENTION

Accordingly, it is an object of the present invention to provide a thermostat device which eliminates the above problems encountered with conventional thermostats.

A further object of the present invention is to provide a thermostat which operates in a fail safe mode should the thermostat malfunction.

Another object of the present invention is to provide a thermostat device for continuously circulating cooling water if the wax in a pallet leaks.

These and other object are achieved by providing a thermostat device, comprising a housing having an inlet port and an outlet port; a valve seat disposed in said housing and having an aperture therein; a first valve for opening and closing said aperture; temperature sensing means for sensing a temperature of fluid supplied to said inlet port, and controlling operation of said first valve based on said sensed temperature; a second valve for opening and closing said aperture; and pressure sensing means for sensing a pressure of said fluid supplied to said inlet port, and controlling operation of said first valve based on said sensed pressure.

These and other objects are further achieved by providing a thermostat device, comprising a housing having an inlet port and an outlet port; a valve seat disposed in said housing and having an aperture therein; a first valve for opening and closing said aperture; control means for controlling operation of said first valve in response to changes in temperature of fluid supplied to said inlet port; fail safe means for allowing said fluid supplied to said inlet port to flow through said aperture when said control means malfunctions.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 3:
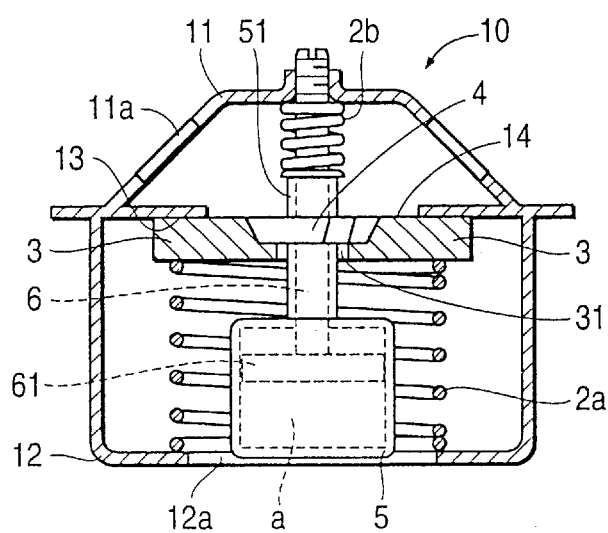
FIG. 3 is a sectional view of a thermostat device for preventing an engine of a vehicle from overheating according to the present invention.
Figure 4:
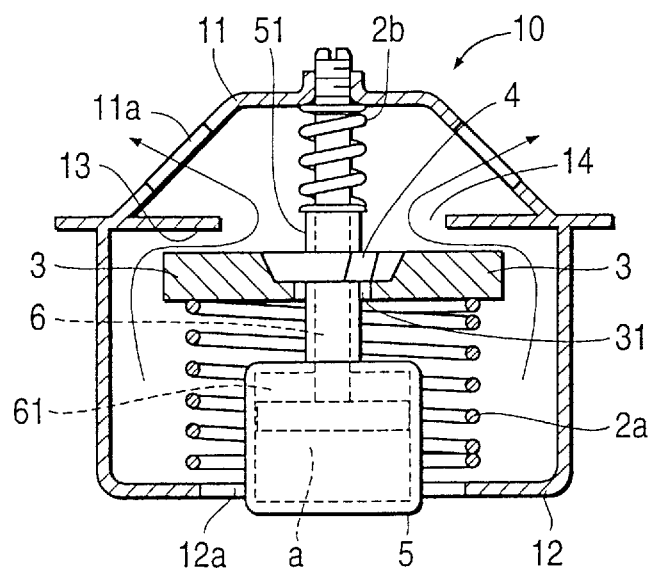
FIG. 4 is a sectional view of the thermostat device according to the present invention in normal operation and in normal open position.
Figure 5:
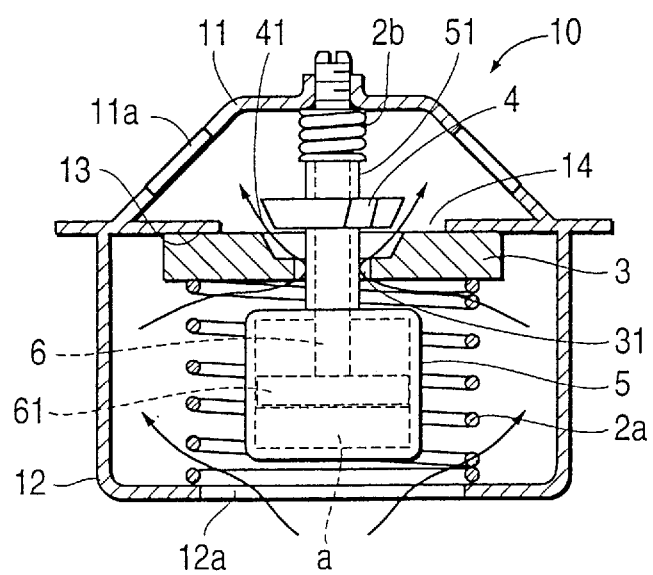
FIG. 5 is a sectional view of the thermostat device according to the present invention in a fail safe mode of operation.

Referring now in detail to the drawings for the purpose of illustrating preferred embodiments of the present invention, the thermostat device 10 for preventing an engine of a vehicle from overheating, will be described with respect to FIGS. 3, 4, and 5. As shown in FIGS. 3–5, the thermostat device 10 includes a housing having an upper frame 11, a lower frame 12, and a valve seat 13 disposed between the upper and lower frames 11 and 12. The valve seat 13 has a circular aperture 14, as a water passage, disposed in a center thereof for passing cooling water therethrough.

A first spring 2a is disposed within the lower frame 12 and attached to the bottom of the lower frame 12, and a valve 3 is attached to the top of the first spring 2a for slidably opening or closing the circular aperture 14 of the valve seat 13. The valve 3 has an aperture 31 and a safe receipt 41 (see FIG. 5) disposed around the aperture 31 for slidably receiving an auxiliary valve 4 thereon.

The thermostat device 10 further includes a pallet 5 having a tubular and perpendicular part 51 attached to the top thereof. A piston 6, having a pressing plate 61 attached to the bottom end thereof, is attached to the upper frame 11 at the top end thereof, and extends into the tubular part 51. The auxiliary valve 4 is attached to the tubular and perpendicular part 51, and a second spring 2b, around piston 6, is inserted between the tubular part 51 and the upper frame 11.

As further shown in FIGS. 3–5, the pallet 5 contains wax a, which expands and contracts in response to changes in temperature (heat changes), in contact with the pressing plate 61 of the piston 6. Further, the upper frame 11 contains an upper opening 11a and the lower frame 12 contains a lower opening 12a.

The thermostat device 10 according to the present invention operates as follows. When the vehicle is parked or when the engine of the vehicle is started, the state of the thermostat device 10 of the present invention is as shown in FIG. 3. That is, the valve 3 is upwardly biased by the spring 2a, and closely contacts the valve seat 13 so that the valve 3 completely closes the cooling water passage 14. Also, the wax a in the pallet 5 does not expand, so that the valve 3 does not move down. Accordingly, the cooling water does not circulate between the engine and the radiator.

Thereafter, when the cooling water is heated by the engine and reaches a certain temperature, the wax a in the pallet 5 expands. Therefore, the pallet 5 moves down relative to the pressing plate 61, and the valve 3, connected to the pallet 5, moves down. Also, the auxiliary valve 4 moves down with the valve 3 in response to the bias force applied by the spring 26. That is, the valve 3 is in an open position as shown in FIG. 4 so that the cooling water circulates in the direction indicated by the arrows in FIG. 4. At this time, the cooling water moves to a radiator (not shown) through the water passage 14 of the valve seat 13. Also, since the auxiliary valve 4 is closely seated on the safe receipt 41 by the resilient power of the second spring 2b, the aperture 31 is firmly closed by the auxiliary valve 4.

During the operation of thermostat device 10 of the present invention, if a malfunction occurs and the wax a leaks, the thermostat device 10 of the present invention operates in a fail safe mode as shown in FIG. 5. Since the wax a in the pallet 5 is leaking, the valve 3 returns to the closed position as shown in FIG. 3 by the resilient power of the second spring 2a. Thereafter, the pressure of the heated cooling water causes the valve 3 to tightly contact the valve seat 13 and tightly close the water passage 14 (see FIG. 5).

Accordingly the pressure of the heated cooling water will increase. When the pressure of the heated cooling water exceeds the bias force of the second spring 2b, the auxiliary valve 4 moves up and opens the aperture 31. This fail safe operation allows circulation of the cooling water in the direction indicated by an arrow as shown in FIG. 5. Accordingly, the cooling water circulates and moves to the radiator through the aperture 31.

The thermostat device 10 according to the present invention has a number of advantages. For instance, in the case of an emergency, the auxiliary valve 4 automatically opens and the cooling water circulates continuously for preventing an engine of a vehicle from overheating.

Figure 1:
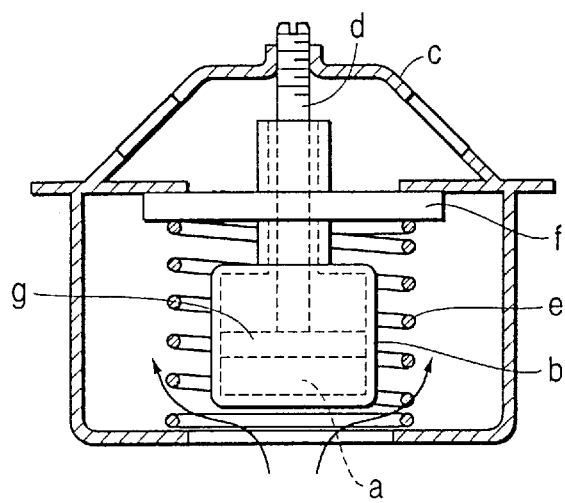
FIG. 1 is a sectional view of a conventional thermostat device.
Figure 2:
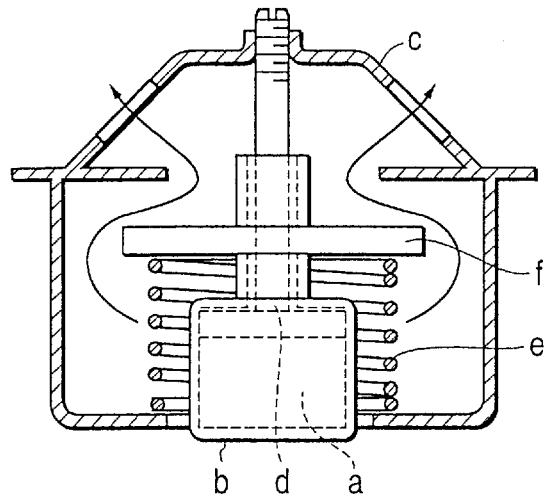
FIG. 2 is a sectional view of the conventional thermostat device in an open position.

While shown applied to the conventional thermostat of FIG. 1, the fail safe structure of the present invention can be applied to all thermostat devices having a valve which operates depending on the temperature of fluid supplied thereto. When the valve malfunctions, the auxiliary valve 4 moves to open the aperture 31 for continuously circulating the fluid.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A thermostat, comprising:

housing having an inlet port and an outlet port;

a valve seat disposed in said housing and having an aperture therein;

a first valve for opening and closing said aperture;

temperature sensing means for sensing a temperature of a fluid supplied to said inlet port, and for controlling an operation of said first valve based on said sensed temperature;

a second valve for opening and closing a portion of said aperture; and pressure sensing means for sensing a pressure of said fluid supplied to said inlet port, and for controlling an operation of said second valve based on said sensed pressure relative to a threshold pressure, said pressure sensing means comprising means for biasing said second valve so as to close said portion of said aperture with a predetermined biasing force, wherein a force applied to said second valve by said fluid at a sensed pressure greater than said threshold pressure exceeds said predetermined biasing force, whereby said second valve moves to open said portion of said second aperture.

2. The thermostat of claim 1, wherein said temperature sensing means comprises:

means for biasing said first valve to close said aperture; and a temperature sensitive material which expands and contracts in response to changes in temperature of said fluid supplied to said inlet, said temperature sensitive material being operationally connected to said first valve such that expansion of said temperature sensitive material causes said first valve to open said aperture.

3. The thermostat of claim 1, wherein said first temperature sensing means comprises:

means for biasing said first valve to close said aperture;

temperature sensitive material having first and second surfaces, said temperature sensitive material expanding and contracting in response to temperature changes in said fluid supplied to said inlet post;

holding means for holding said temperature sensitive material, said holding means contacting said first surface of said temperature sensitive material and being connected to said first valve;

a fixed piston disposed in contact with said second surface of said temperature sensitive material such that as said temperature sensitive material expands, said holding means move relative to said piston and said first valve moves away from said valve seat, thereby opening said aperture.

4. The thermostat of claim 1, wherein said means for biasing said second valve is a spring.

5. The thermostat of claim 1, wherein said first valve includes a valve aperture, and said second valve opens and close asaid aperture.

6. A thermostat, comprising:

a housing having an inlet port and an outlet port;

a valve seat disposed in said housing and having an aperture therein;

a first valve for opening and closing said aperture;

control means for controlling operation of said first valve in response to changes in temperature of a fluid supplied to said inlet port; and fail safe means for allowing said fluid supplied to said inlet port to flow through said aperture when said control means fails to control operation of said first valve in response to changes in temperature of said fluid, when a pressure of said fluid at least reaches a threshold pressure, said fail safe means comprising a second valve for opening and closing a portion of said aperture; and pressure sensing means for sensing a pressure of said fluid supplied to said inlet port, and controlling operation of said second valve based on said sensed pressure relative to said threshold pressure, said pressure sensing means comprising means for biasing said second valve to close said portion of said aperture with a predetermined biasing force, wherein a force applied to said second valve by said fluid at a pressure greater than said threshold pressure exceeds said predetermined biasing force, whereby said second valve moves to open said portion of said second aperture.

7. The thermostat of claim 6, wherein said control means comprises:

means for biasing said first valve to close said aperture; and temperature sensitive material which expands and contracts in response to changes in temperature of said fluid supplied to said inlet, said temperature sensitive material being operationally connected to said first valve such that expansion of said temperature sensitive material causes said first valve to open said aperture.

* * * * *